Aug. 27, 1968  R. C. KELLER  3,398,594
SPLINE ANTIRATTLE DEVICE FOR COUNTERSHAFT TRANSMISSION
Filed May 2, 1967  2 Sheets-Sheet 1

INVENTOR.
Robert C. Keller
BY
A. M. Heiter
ATTORNEY

Aug. 27, 1968 R. C. KELLER 3,398,594
SPLINE ANTIRATTLE DEVICE FOR COUNTERSHAFT TRANSMISSION
Filed May 2, 1967 2 Sheets-Sheet 2
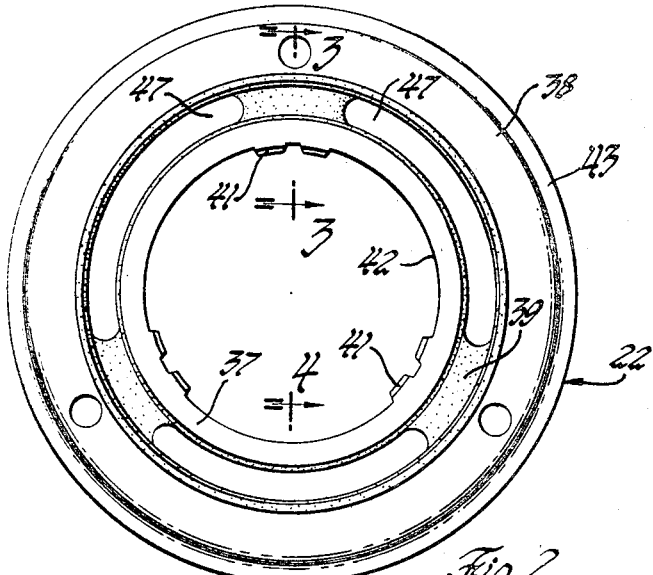
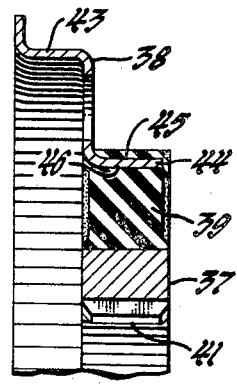
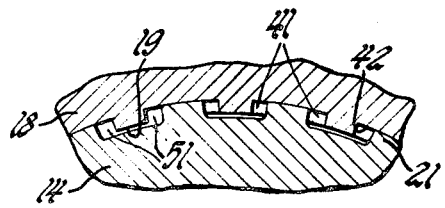
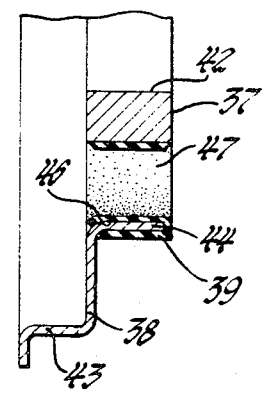
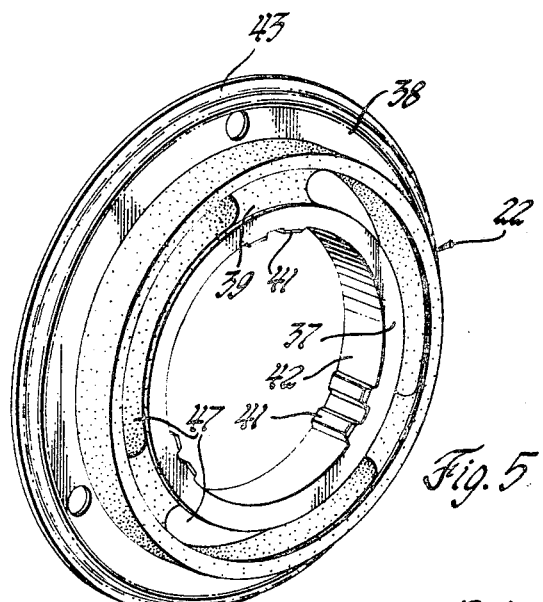
INVENTOR.
Robert C. Keller
BY
A. M. Heiter
ATTORNEY

United States Patent Office 3,398,594
Patented Aug. 27, 1968

3,398,594
SPLINE ANTIRATTLE DEVICE FOR
COUNTERSHAFT TRANSMISSION
Robert C. Keller, Troy, Mich., assignor to General Motors Corporation, Detroit, Mich., a corporation of Delaware
Filed May 2, 1967, Ser. No. 635,485
8 Claims. (Cl. 74—333)

ABSTRACT OF THE DISCLOSURE

An antirattle device for use with a countershaft transmission comprising an outer hub secured to a head gear, an inner hub in splined engagement with a countershaft and a resilient vibration damping member bonded to the outer and inner hubs is disclosed. The resilient member effectively dampens torsional vibrations imposed by an engine on the head gear when the countershaft is being rotated under a no load condition by the head gear. The resilient member has sufficient yieldability to permit deflection, well within its elastic limit, so that splines on the head gear engage the countershaft when a driving torque is transmitted via the head gear and countershaft.

---

This invention relates to antirattle devices and more particularly to antirattle devices in gear change transmission wherein a countershaft is employed to transmit speed and torque from an input shaft to an output shaft during some gear ratios and rotates unloaded during at least one gear ratio.

The normal torsional vibrations of an internal combustion engine drive cause the unloaded toothed members of a transmission to rattle. Efforts to reduce gear rattle, such as increasing the engine flywheel inertia or changing the torsional stiffness of the system are not entirely successful. The present invention reduces gear rattle by adding an antirattle member to the head gear set of the transmission. The head gear set transmits speed and torque from the input shaft to the countershaft. From the countershaft the speed and torque is transmitted to the output shaft via the selected one of a number of speed ratio gear sets. The transmission also has a one-to-one speed ratio wherein the input shaft is coupled directly to the output shaft. During the one-to-one speed ratio the countershaft is rotated, however, it does not transmit any driving torque, but does carry the low torque required for idling the countershaft and the unselected speed ratio gear sets. Thus the toothed members, such as gears and splines, engage and disengage under the influence of the torsional vibrations transmitted from the engine through the input shaft and head set to the countershaft. The present invention effectively isolates the countershaft from the engine torsional vibrations.

The antirattle device or isolator has an inner hub and an outer hub separated by and bonded to a resilient damping member. The inner hub has a splined I.D. which mates with the splines on the countershaft. The outer hub is pressed on the countershaft head gear which has a splined I.D. The spline teeth on the head gear have less tooth thickness and greater tooth space than the spline teeth on the inner hub. Therefore, the spline teeth on the head gear do not contact the spline teeth on the countershaft when the countershaft is rotated without transmitting any driving torque. The resilient damping member transmits the low torque required for idling the countershaft and permits damped oscillating movement of the teeth on the head gear spline without contact in the tooth space of the spline on the countershaft, thereby isolating the torsional vibrations from the countershaft. When the countershaft is required to transmit a load, the resilient damping member yields well within its elastic limit to permit the spline teeth of the head gear and the countershaft to engage to transmit the load so that the load is not carried by the antirattle device.

An object of this invention is to provide an improved arrangement to prevent spline and gear rattle in an automotive transmission.

Another object of this invention is to isolate the countershaft of a constant mesh transmission from the torsional vibrations of a driving engine.

A further object of this invention is to provide a resilient damping drive which prevents spline tooth contact between a gear and a shart during transmission of the low torque for the idling drive when no load is being transmitted and permits contact when a load is being transmitted.

These and other objects will be more apparent from the following description and drawings of the preferred embodiment.

FIGURE 2 is an end view of the antirattle device shown in FIGURE 1.

FIGURE 3 is a sectional view taken along line 3—3 of FIGURE 2.

FIGURE 4 is a sectional view taken along line 4—4 of FIGURE 2.

FIGURE 5 is a perspective view of the preferred embodiment of the invention.

FIGURE 6 is a sectional view taken along line 6—6 of FIGURE 1.

Figure 1:
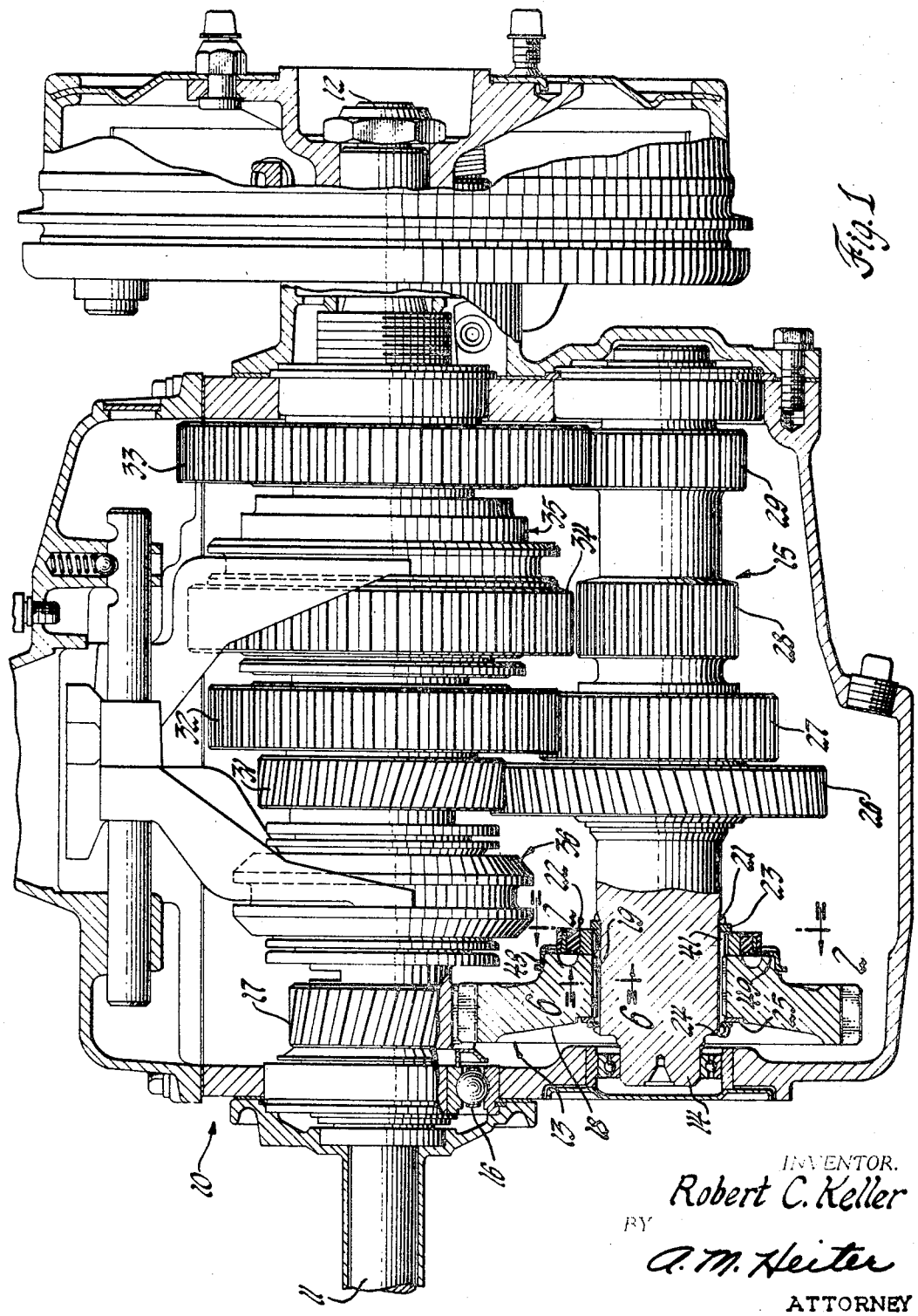
FIGURE 1 is an elevational view, partly in section, of a multispeed ratio transmission containing the invention.

Referring now to the drawings, there is shown in FIGURE 1 a transmission 10 having an input shaft 11, an output shaft 12, a head gear set 13, a countershaft 14 and speed change gear sets shown generally as 15. The input shaft 11 is connected to an internal combustion engine, not shown, by a manually operated clutch, not shown. The input shaft 11 is rotatably supported by a ball bearing 16. Integral with the input shaft 11 is an input head gear 17 which meshes with countershaft head gear 18. The head gear 18 has a splined I.D. 19 and is mounted on a set of splines 21 which are integral with the countershaft 14. Secured to the head gear 18 is an antirattle device or isolator shown generally at 22. The axial position of the head gear 18 and the isolator 22 relative to the countershaft 14 is maintained by snap rings 23 and 24 and thrust washer 25. Integral with or otherwise secured to the countershaft 14 are cluster gears 26, 27, 28 and 29 which are components of the speed change gear sets 15. Rotatably supported on the output shaft 12 are gears 31, 32 and 33 which mesh with cluster gear 26, 27 and 29 respectively. Gear 34 is rotatably supported and drivingly secured on output shaft 12 and can be operatively connected to cluster gear 28 by a slidable idler gear, not shown. Gears 33, 32 and 31 may be selectively drive connected to the output shaft 12 by synchronizer clutching units, shown generally as 35 and 36 to produce first, second and third gear speed ratios respectively. Fourth gear or a one-to-one speed ratio is effected by coupling the input shaft 11 to the output shaft 12 through the synchronizer clutching unit 36. In first, second and third gear ratios, the torque and speed components of the engine are transmitted by the input shaft 11 through the head gear set 13, the countershaft 14 and gear combination 26–31, 27–32 or 29–33 to the output shaft 12. Under these conditions the head gear set is transmitting a load sufficient to maintain contact between the spline teeth 19 and 21. During fourth gear, the torque is transmitted directly from input shaft 11 to output shaft 12; however, the head gear 18 is rotated by head gear 17 and inertia load or gears 26, 27, 28, 29, 31, 32 and 33 and the frictional load of the countershaft 14 when idling is transmitted by the head gear set 13. Since this load is small, the torsional vibrations of the engine are sufficiently large, by comparison, to cause the spline teeth and gear teeth to oscillate and cause noise or rattle. The isolator 22 prevents the noise or rattle from occurring.

The antirattle device 22, best seen in FIGURES 2 and 5, has an inner hub 37, an outerhub 38 and a resilient member 39 bonded to and separating the inner hub 37 and the outer hub 38. The inner hub 37 has spline teeth 41 formed on its inside diameter 42. The spline teeth 41 have a greater tooth width and a lesser tooth space than the spline teeth 19. However, the circular pitch of teeth 19 and 41 are the same. It has been found that three sets of two teeth each is sufficient, however, a full compliment of spline teeth can be used if desirable. These teeth 41 do not have to transmit the driving torque supplied to the transmission, as will be explained later.

The outer hub 38 has a flange 43, extending to the left as viewed in FIGURES 3 and 4, on its outside diameter and a flange 44, extending right, on its inside diameter. The resilient member 39 is bonded to the inner surface 46 of the flange 44. The resilient member 39, in the preferred embodiment, is made from Buna N rubber although other yieldable materials, such as polyurethane, can be used. For satisfactory operation of the isolator, the resilient material used should be resistant to deterioration by petroleum products, ozone and ageing and have a high damping capacity capable of dissipating vibratory energy. The isolator 22 has been found to be effective in reducing rattle, when the resilient member 39 has sufficient yieldability to permit a 6° rotation of the outer hub 38 relative to the inner hub 37 under the influence of a torque load of 39 to 55 inch-pounds applied to the outer hub 38 while the inner hub 37 is held stationary. The resilient member 39 is generally annular in shape and has a plurality of arcuate apertures 47. The size of the aperture 47 controls the yieldability or torsional stiffness of the resilient member 39. If a more yieldable member is required the apertures 47 can be made larger and vice-versa.

The head gear 18 has a shoulder 48 and an annular abutment surface 49. The shoulder 48 has three equally spaced radial apertures, not shown, drilled therein. The centerline of spline teeth 41 and 19 are aligned and the outer flange 43 of the isolator 22 is pressed over the shoulder 48 so that the outer hub 38 abuts the abutment surface 49. The outer flange 43 of the outer hub 38 is staked or deformed so that portions of it engage the radial apertures of shoulder 48. This staking operation aids in preventing relative rotary movement between the head gear 18 and the outer hub 38 of the isolator 22. The head gear 18 and isolator 22 assembly is mounted on the splines 21 of countershaft 14. Due to the larger width of spline teeth 41, they are in close mating relation to spline teeth 21 while a relatively large clearance 51 exists between spline teeth 19 and 21. This clearance 51 permits the head gear 18 to oscillate relative to the inner hub 37 and the countershaft 14 when a torsional vibration is induced on the head gear set 13 by the engine and the head gear set 13 is rotating unloaded. The yieldability of the resilient member is limited so that during the unloaded drive, the resilient member transmits the torque required to rotate the countershaft and connected gearing which is idling without contact at the splines 19 and 21. The resilient member 39 due to internal friction absorbs the vibration and due to a press fit between spline teeth 21 and 41 prevents rattle of the spline teeth 21 and 19, the gears 17 and 18 of the head gear set 13 and the gears in the speed change gear sets 15. When a load is transmitted by the head gear set 13 to the countershaft 14, as in first, second, third and reverse gear ratios, the resilient member 39 permits the outer hub 38 and the head gear 18 to rotate relative to the inner hub 37 and countershaft 14 thereby establishing contact between spline teeth 19 and 21. Thus the antirattle device 22 does not have to carry the vehicle driving torque.

The spline teeth 41 of inner hub 37 are in interference fit with or pressed onto the spline teeth 21 of countershaft 14. This is especially advantageous when the gears 17 and 18 have helical teeth; since the forces due to the interference fit will absorb the axial separating forces associated with meshed helical gears thereby reducing or eliminating the thrust load imposed on the snap rings 23 and 24. This arrangement also permits the isolator 22 to absorb translational vibrations that may be introduced into the gearing.

Many variations can be made in view of the above teachings. It is therefore to be understood that within the scope of the appended claims, the invention may be practiced otherwise than as specifically described.

What is claimed is:

1. In a transmission a driving member, a driven member, intermediate drive means including an intermediate member having splines thereon and being subject to rotation under loaded and unloaded conditions, a head gear set having a splined member and adapted to transmit rotation from said driving member to said intermediate member, resilient means including a resilient member and an inner splined member for preventing rattle between said intermediate member and said splined member of said head gear set, and means for changing the speed ratio of the driving member to the driven member.

2. The invention defined in claim 1 and said splines on said intermediate member and said splined member having a predetermined clearance, said resilient means transmitting sufficient torque during rotation under said unloaded condition to provide the unloaded drive to idle said intermediate drive means and permitting relative rotation of said splined member and intermediate member so the internal friction of said resilient member damps vibration limiting relative movement to less than that permitted by said predetermined clearance and said resilient means being deformed within its elastic limit when rotating under the loaded condition to permit contact of said intermediate member and said splined member for drive through said splines.

3. The invention defined in claim 1 and said means for preventing rattle including an outer hub bonded to said resilient member and secured to said splined member of said head gear set, means for preventing relative rotary movement between said outer hub and the splined member of the head gear set, said resilient member having a plurality of arcuate apertures to control torsional stiffness of the means for preventing rattle.

4. The invention defined in claim 3 and said resilient member having sufficient torsional stiffness to permit 6° of angular displacement of said outer hub member relative to said inner splined member when a torque in a range of 39 to 55 inch-pounds is applied to the outer hub member while the inner splined member is held stationary.

5. In a transmission, an input shaft, an output shaft coaxial with said input shaft, a countershaft having splines thereon and being parallel to the input and output shafts and subject to rotation under loaded and unloaded conditions, a head gear set, and means including gear sets for changing the speed ratio of the input shaft to the output shaft, said head gear set including a first gear affixed to the input shaft, a second gear having splines thereon and meshing with said first gear, and an antirattle device secured to said second gear, said antirattle device comprising an inner hub member having splines thereon, an outer hub member secured to said second gear, and a resilient member bonded to said inner member and said outer member to permit small angular displacement of the outer member relative to the inner member, said splines on said inner member engaging said splines on said countershaft in close mating relation, said splines on said second gear having a clearance from the splines on the countershaft and said resilient member having sufficient internal friction to permit damped vibratory movement of the second gear less than the clearance when the countershaft is rotated in the unloaded condition and said resilient member being deformed to permit contact of the splines on the second gear with the splines on the countershaft when the countershaft is rotated in the loaded condition, and said resilient member being effective to maintain contact between the first and second gears when a torsional vibration is imposed on said input shaft thereby preventing rattle between the meshing gears.

6. The invention defined in claim 5 and said resilient member being an annular ring of Buna N rubber having a plurality of arcuate apertures and having sufficient torsional stiffness to permit 6° of relative angular displacement between said inner hub and said outer hub when a torque in a range of 39 to 55 inch-pounds is applied to the outer hub while the inner hub is held stationary.

7. The invention defined in claim 5 and said outer hub member having a flange adapted to be pressed onto said second gear, and means including the outer hub member for preventing relative rotary movement between the outer hub member and the second gear.

8. In a transmission drive means; driven means; intermediate drive means including a splined portion; head gear means connecting said drive means to said intermediate drive means and multi-ratio drive means having at least a first ratio means, selectable to connect the intermediate drive means to the driven means, and a second ratio means, selectable to connect the drive means to the driven means; said head gear means including a splined member and resilient means including an inner member having splines thereon; said splines on said inner member being in close mating relation with said splined portion of said intermediate drive means and said splines on the splined member having a predetermined clearance with said splined portion; said resilient means transmitting sufficient torque when said second ratio is selected to rotate said intermediate drive means and permit said splined member to oscillate relative to said splined portion and having sufficient internal friction to dampen vibrations so that the oscillation of said splined member does not have an amplitude greater than the predetermined clearance; and said resilient means being deformed, within its elastic limit, when said first ratio is selected to permit contact between the splined member and the splined portion when a torque is being transmitted from the drive means to the driven means via the head gear means and the intermediate drive means.

References Cited
UNITED STATES PATENTS

| | | | |
|---|---|---|---|
| 3,105,395 | 10/1963 | Perkins | 74—411 X |
| 3,109,317 | 11/1963 | Cousino et al. | 74—411 |
| 3,350,954 | 11/1967 | Ruettinger | 74—333 |

FRED C. MATTERN, JR., *Primary Examiner.*

LEONARD H. GERIN, *Assistant Examiner.*